(12) United States Patent
Kwon

(10) Patent No.: US 7,212,521 B2
(45) Date of Patent: May 1, 2007

(54) METHOD AND APPARATUS FOR SERVING OF STATION GROUP IN INTERNET PROTOCOL TELEPHONY EXCHANGE SYSTEM

(75) Inventor: Jun-Young Kwon, Kunpo-shi (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1121 days.

(21) Appl. No.: 10/263,775

(22) Filed: Oct. 4, 2002

(65) Prior Publication Data

US 2003/0072300 A1    Apr. 17, 2003

(30) Foreign Application Priority Data

Oct. 13, 2001   (KR)   ............................. 2001-63240

(51) Int. Cl.
*H04L 12/64* (2006.01)
(52) U.S. Cl. .................................................... 370/352
(58) Field of Classification Search ................ 370/352, 370/353, 355, 356
See application file for complete search history.

(56) References Cited

U.S. PATENT DOCUMENTS

2003/0072301 A1* 4/2003 Ko ............................ 370/352
2003/0072330 A1* 4/2003 Yang et al. ................. 370/493
2004/0248590 A1* 12/2004 Chan et al. ............. 455/456.3

FOREIGN PATENT DOCUMENTS

| WO | WO 01 06740 A2 | 6/1997 |
|---|---|---|
| WO | WO 99 05590 A2 | 6/1997 |
| WO | WO 02 11411 A1 | 11/2002 |

OTHER PUBLICATIONS

"Search Report under Section 17" dated on Mar. 17, 2003 issued by U.K. Patent Office.
Bur Goode, "*Voice Over Internet Protocol (VoIP)*," IEEE, vol. 90, No. 9, pp. 1495-1517, Sep. 2002.

* cited by examiner

*Primary Examiner*—Melvin Marcelo
(74) *Attorney, Agent, or Firm*—Robert E. Bushnell, Esq.

(57) ABSTRACT

Disclosed is an apparatus and a method for placing calls between legacy terminals and IP terminals in an IP-PBX system. Features that were once only used in traditional PBX telephone systems, like group ring services and station group services are now made available for IP terminals in an IP-PBX system. Methods of providing station group service and ring group service to both legacy terminals and IP terminals in an IP-PBX system is disclosed.

20 Claims, 7 Drawing Sheets

METHOD AND APPARATUS FOR SERVING OF STATION GROUP IN INTERNET PROTOCOL TELEPHONY EXCHANGE SYSTEM

CLAIM OF PRIORITY

This application claims priority under 35 U.S.C. § 119 to my application entitled "METHOD FOR SERVICING OF STATION GROUP IN INTERNET PROTOCOL TELEPHONY EXCHANGE SYSTEM" filed in the Korean Industrial Property Office on Oct. 13, 2001 and assigned Serial No. 2001-63240, the contents of which are hereby incorporated by reference.

BACKGROUND OF THE INVENTION

1. Field of the Invention

The present invention relates generally to a method for serving of a station groups in the Internet protocol telephony exchange system, having a configuration to be able to control both IP terminals and legacy terminals by transceiving user information with IP terminals.

2. Description of the Related Art

Recently, as Internet is expanding rapidly to the vast majority of the world, and to meet the needs for a variety of different services, IP has been developed at a remarkable speed in terms of performances and services it provides to users. Not being satisfied here, users are continually asking for more diverse services. One of the examples is transmission of voice signals using IP network (or VoIP: Voice over Internet Protocol). Besides the data transmission of voice signals through such IP network, other manifold services associated with the voice signal transmission, yet they being a major part of the IP network, have been requested more and more.

As an attempt to meet the request, a technique for integrating generally used legacy telecommunication and VoIP is under development for interworking with a current communication network. For instance, integration of IP-based private automatic branch exchanges, i.e., IP-PBX (Internet Protocol PBX) and IP-Centrex, is the typical one. Therefore, to satisfy different needs of users, the terminals for use of IP network should be able to have the same format and same performances with those used for PSTN (Public Switching Telephone Network).

A general IP-phone protocol currently being used right now is one of H.323 recommended by ITU-T, MGCP (Media Gateway Control Protocol) used between a media gateway and a media gateway controller for controlling the media gateway, or SIP (Session Initiation Protocol), a multimedia communication standard supporting integration of data, voice and image.

Normally, IP network and PSTN are separated from each other, and therefore, terminals that are accessible to each net have different protocols and different characteristics. More specifically, terminals that are connectable to PSTN are subscriber terminals including analog telephones, digital telephones or modems, while terminals that are connectable to trunk connection part include E1/T1, PRI (primary rate interface), loop and No. 7 signaling and so forth. Further, terminals that are connectable to IP network include H.323 terminals, MGCP terminals, SIP terminals and so on. To transmit/receive voices using an IP-terminal and IP network, the terminal should be connected to IP-line through LAN and gatekeeper.

In other words, to enable IP network subscribers and PSTN subscribers to communicate with each other by interworking of IP network and PSTN, any type of gateway is necessary, and to seize such gateway, an independent system for seizing internetwork should be configured. This means that IP network and PSTN have their own mutually independent number systems and terminal management systems.

In case a general legacy terminal accommodated to PSTN calls another general legacy terminal, depending on the address of a called party's terminal (domestic, long-distance, overseas, wire/wireless), a pre-designated prefix is dialed to make the call. However, if the called party uses an IP terminal, it was essential to dial a prefix seizing a gateway that is connected to a corresponding exchange.

Similarly, users having IP terminal connected over Internet should dial a pre-designated prefix in conforming to the address of the other party (domestic or other areas). And, if it is necessary to make a call to PSTN, users must dial a prefix for seizing a gateway that is connected to an exchange system to control the other party's terminal.

However, according to the conventional technology described above, mutually independent systems are in charge of controlling calls between PSTN based terminals and IP network based terminals. Thus, to configure voice channels between IP terminals and legacy terminals, two separate systems are required. This means that a service should be carried out independently over the interwork of the two systems, and integrated function and terminal management system over internetwork is therefore impossible. Unfortunately, this made it very difficult to integrate IP terminals in areas using the existing PSTN or within a building. That is, implementation of an IP based internal private automatic branch exchange got very complicated since PBX cannot process calls from IP terminals like extension telephones, and as a result thereof, a number of services provided by PBX were not available.

For example, station group services and ring group services from the local private automatic branch exchange cannot be provided. The station group service indicates a service where a plurality of terminals are registered to the exchange as one station group, each station group having a general directory number, so when a caller makes a phone call to the general directory number of the station group, the call reaches a subscriber to whom the call can be received in conforming to the group service system. Such station group service uses a system like "HUNT, DISTRIBUTION, EQUALITY" and so forth.

Similarly, the ring group service (or group call pickup) indicates a service where a plurality of terminals are registered to the exchange as one ring group, each station group having a general directory number, so when a caller makes a phone call to the general directory number of the ring group, the call reaches any member of the ring group who is in an idle state at the moment. And, if one member answers the phone, other members do not hear the ring any more. At this time, if every member of the ring group happens to be in middle of conversation over the phone, the call is queued for a second. Then, as soon as there is a member who finished his or her call, the call in queue mode is connected right to the member available.

However, in the conventional IP-PBX a legacy terminal connected to PBX and an IP terminal connected to an IP network had different systems from each other. This consequently made the IP-PBX unable to provide station group services that are typically available in the PBX because it could connect only traffic channels through a gateway.

SUMMARY OF THE INVENTION

It is therefore an object of the present invention to provide a method for serving of a station group in the internet protocol telephony exchange system for providing a variety of group services to IP terminals, by applying the same telephone system and same maintenance system to IP terminals and legacy terminals.

Another object of the present invention is to provide the method for serving of a station group in the internet protocol telephony exchange system for providing station phone group services to IP terminals, by applying the same telephone system and same maintenance system to IP terminals and legacy terminals.

Still another object of the present invention is to provide the method for serving of a station group in the Internet protocol telephony exchange system for providing ring group services to IP terminals, by applying the same telephone system and same maintenance system to IP terminals and legacy terminals.

To achieve the above objects, there is provided the method for serving of a station group in the internet protocol telephony exchange (IP-PBX) system, wherein the IP-PBX system includes a hub connected to an internet protocol (IP), having a plurality of LAN communication ports, user information interface connected to the LAN communication port of the hub for generating user information and for outputting the generated user information or for converting received exchange user information to an identifiable state to users, at least one IP terminals for performing VoIP function in conforming to a pre-designated data communication protocol procedure, IP driver connected to the LAN communication port of the hub for controlling internet protocol endpoints; and IP-PBX (internet protocol—private automatic branch exchange), mounted with a database, where telephone numbers of a legacy terminal (or digital or analog telephone) and the plurality of IP terminals, corresponding terminal information and group service information of terminals are stored, and an exchange interface and a gateway connected to the LAN communication port of the hub, respectively, for conducting call processing services corresponding to user information that is sent to the exchange interface and corresponding to call connection information that is generated from the legacy terminal, the method including the steps of: when a dialing digit corresponding to a general directory number of a station group is transported form an internet protocol (IP) terminal, seizing a relevant station group, and when the relevant station group gives a seizure ACK, discovering whether a terminating party is an IP terminal; if the terminating party is an IP terminal, providing a ring back tone to the originating terminal, and ringing the designated terminating IP terminal; and if the terminating party is a legacy terminal, seizing the gateway channel and sending a ring back tone to the originating terminal, and ringing the designated terminating legacy terminal.

A method of placing a call from an IP terminal to either an IP terminal or a legacy terminal in an IP-PBX is provided in the discussion of FIG. 2 and a method of placing a call from a legacy terminal to an IP or another legacy terminal in an IP-PBX is provided in the discussion of FIG. 3. Further, a method for placing a call from an IP terminal to an IP-PBX using station group services is provided in the discussion of FIG. 4. A method for placing a station group services call from a legacy phone to either another legacy phone or an IP terminal in an IP-PBX is provided in the discussion of FIG. 5. A method for providing ring group service from a call originating from an IP terminal in an IP-PBX exchange is provided in the discussion of FIG. 6. A method for providing ring group service from a legacy terminal is provided in FIG. 7.

The above described invention is very advantageous especially for IP-PBX system, in which call processing relevant information of the IP terminal is controlled by the call processing module within IP-PBX, in that the present invention can easily provide station group service of the IP terminal, thereby fulfilling a multifunctional system.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar elements components, wherein.

DETAILED DESCRIPTION OF THE INVENTION

Figure 1:
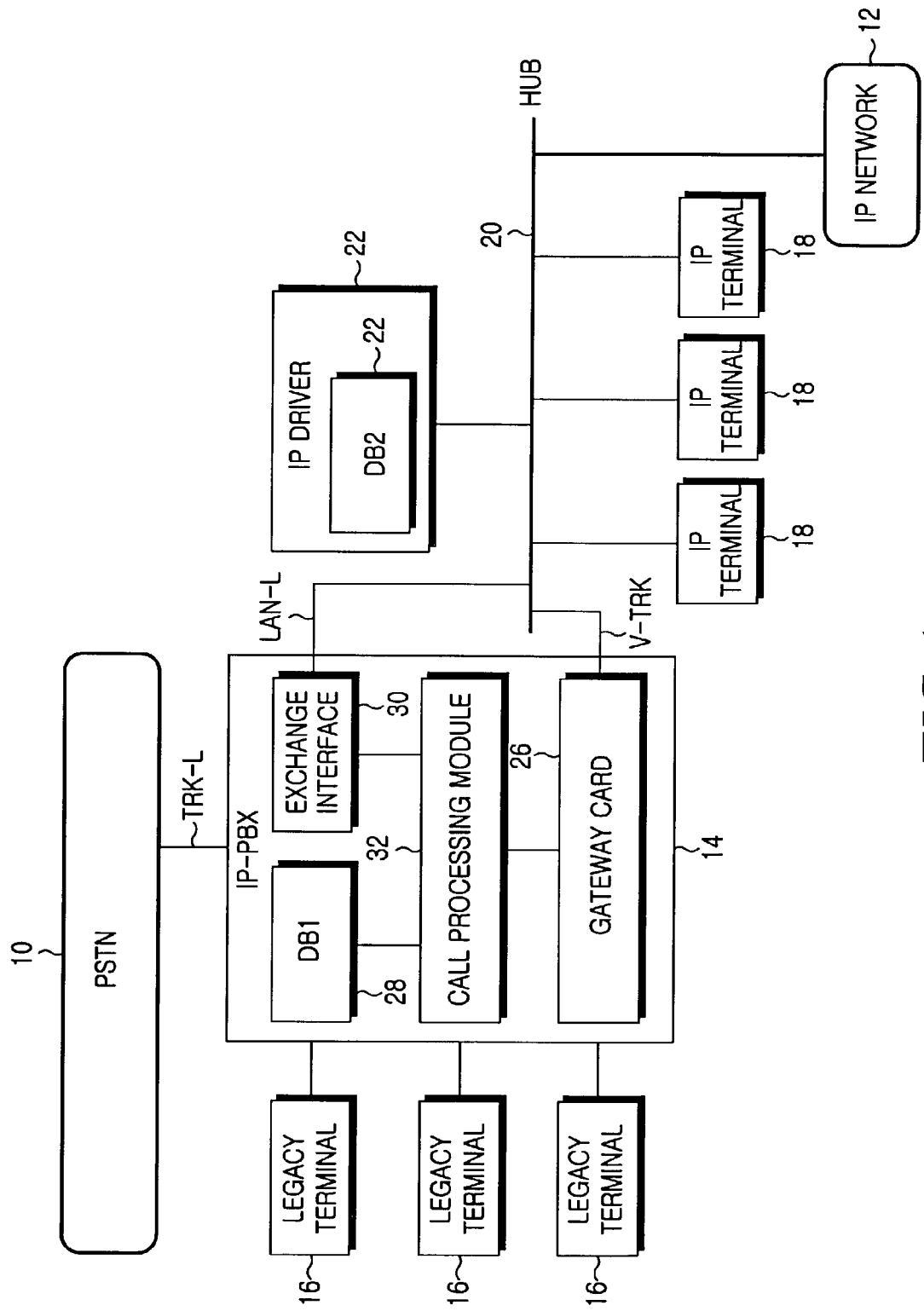
FIG. 1 is a block diagram of an Internet protocol (IP) telephony system in accordance with one preferred embodiment of the present invention.

FIG. 1 is a block diagram of Internet protocol (IP) telephony system embodying the principles of the present invention. As shown in the drawing, IP-PBX 14 for conducting channel switching of at least one legacy terminals 16 is connected to PSTN 10 through a central office card (or board circuit) (now shown). Although not fully explained in the present invention, the central office trunk card that interfaces E1/T1, PRI/BRI/No. 7 signaling is well known in this filed. Further, channel connection by originating/terminating terminals, more specifically, at least one legacy terminals, such as, analog telephones or digital telephones, is also well known in the art. Therefore, the embodiment of the present invention will be narrowed down to call connection services between legacy terminals and IP terminals, call connection services between IP terminals, and IP trunk from legacy terminals/IP terminals (VoIP connection through a gateway).

IP-PBX system embodying the principles of the present invention largely includes IP-PBX 14 connected to PSTN 10 for carrying out general call processing services of legacy terminals 16; IP terminals 18 connected to the IP-PBX 14 and IP network 12, having a user interface that generates and displays every kind of tone in response to dialing tones, ring tones and ring back tones, or every kind of display information message input, and generates dial digit information; and IP driver (gate keeper) 22. Here, IP-PBX 14 includes a gateway card 26 for mutually connecting different kinds of telecommunication networks. Further, the IP-PBX 14, the gateway card 26 located at the inside thereof, the IP driver 22, and the plurality of IP terminals 18 are all connected IP network 12, and eventually to LAN terminal port of hub 20 that performs switch connection a number of LAN ports. Usually, any commercially used hub can be employed for the hub 20.

IP-PBX 14, besides providing a call processing service of general legacy terminals 16, is capable of processing calls from IP terminals 18 connected to IP network 12 in the same light with calls from extension subscribers. The operation involved here is now explained as follows.

IP-PBX 14 includes database 28, in which subscriber information, such as, telephone numbers of IP terminals 18 that are connected to IP network 12 through hub 20 using telephone numbers of legacy terminals that are accommodated to the IP-PBX 14 and information on port numbers, IP terminals, or IP addresses, is stored; a gateway card 26 for forming a basic channel between the IP network 12 and PSTN; an exchange interface 30 for receiving information about a calling party that is transported from the plural IP terminals 18 connected through the hub 20, or for transporting terminating call information to the IP terminals; and a call processing module 32 for controlling call services between the legacy terminals 16 and the IP terminals 18. Exchange interface 30 and gateway card 26 include LAN for making LAN communication through the hub 20.

IP terminals 18 include a user interface which generates user information like hook state information including ID code, digit, and every kind of tone message, and transmits/receives the generated user information; and a communication module connected to IP network for conducting VoIP function in accordance with H.323/MGCP/SIP protocol procedure. Here, the user interface mainly generates different kinds of tones in response to a message or command provided from IP-PBX 14, or operates a displayer, or generates every kind of digit tone corresponding to pre-Page designated telephone numbers onto IP terminals, port numbers, IP addresses, and key buttons the users selected. The user information is then interfaced with IP-PBX 14 through LAN.

Later, IP terminals 18 provide ID code obtained from IP-PBX 14, such as, user information like telephone numbers and port numbers, to exchange interface 30 inside of IP-PBX 14 through LAN. Usually, user information data that is transmitted/received directly with IP-PBX 14 through the exchange interface 30 includes ID code, dial on/off messages, digit information and other information for controlling terminals.

IP driver (gatekeeper) 22, connected to the IP-PBX 14, and to the IP terminals 18 through hub 20, controls IP endpoints in response to IP terminal connection information based on the H.323/MGCP/SIP protocol procedure, and in response to call processing information. Here, the IP endpoints are where the IP terminals are located.

Thusly constructed IP-PBX system of the present invention makes things like addition/change/deletion of subscriber information much easier by offering telephone numbers given to legacy terminals 16, and every subscriber information to each of the plural IP terminals 18 connected to IP network 12 through hub 20. For example, using a maintenance terminal (not shown), information like telephone numbers, port numbers, and IP addresses corresponding each IP terminal 18, is loaded upon database 28. The maintenance involved here is done as usual. Shortly speaking, the present invention having the configuration shown in FIG. 1 makes it possible to maintain information in a single integrated system, and this is quite different from the conventional system in which two independent systems were required for the same. In other words, whether it is of an IP terminal or legacy terminal, the call is processed is equally in one system.

More details on call processing between an IP terminal and another IP terminal, call processing operation between IP terminals and legacy terminals, and call processing operation from a legacy terminal or an IP terminal to IP network 10 in the IP-PBX system having the configuration shown in FIG. 1 are disclosed in the Patent Application No. 63192, applied on Oct. 13, 2001 by Do-Yong Yang et al., under the title "Internet Protocol Telephony System and Call Processing Method Thereof". Therefore, it should be noted that the present invention only describes the operation conducted in a case that IP terminal/legacy terminal makes a call to the general directory number of the extension/ring group. Other basic operations or technologies involved in the IP-PBX system are found in Patent Application No. 2001-63192.

Figure 2:
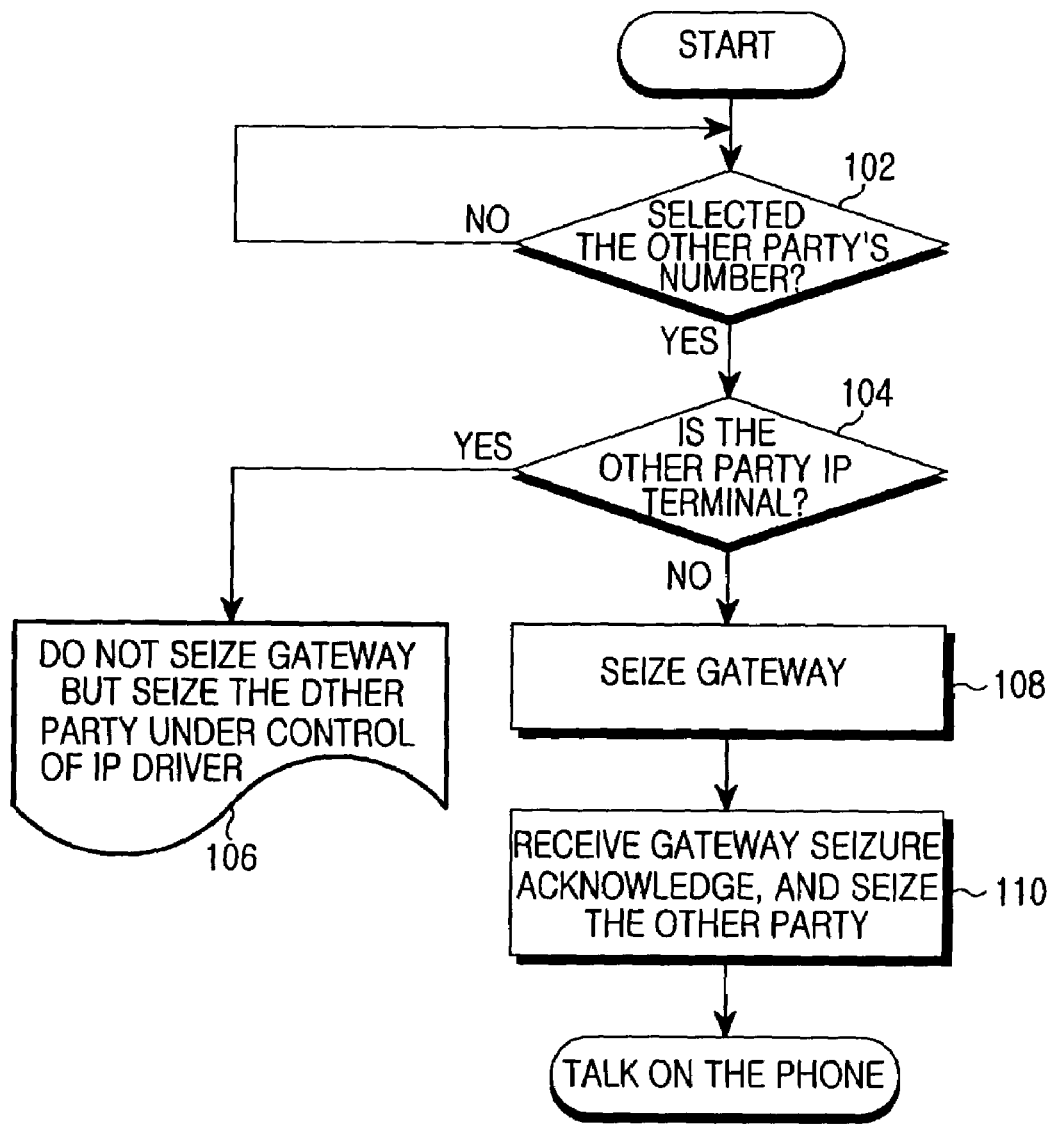
FIG. 2 and FIG. 3 are flow charts illustrating call processing control procedures in accordance with the preferred embodiment of the present invention, more particularly, the call processing procedure when an IP terminal makes a call and when a legacy terminal makes a call, respectively.
Figure 3:
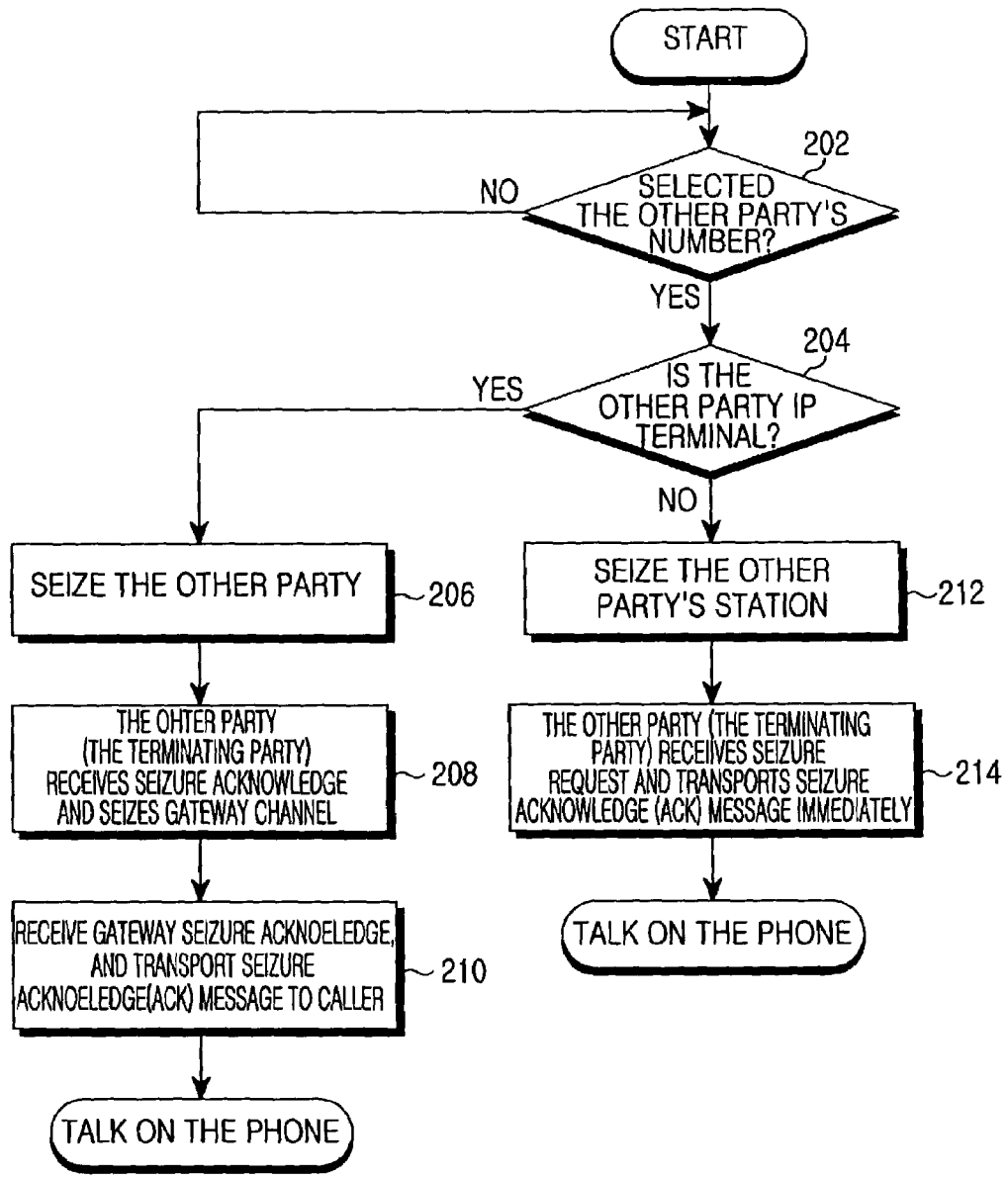

FIG. 2 and FIG. 3 are flow charts illustrating call processing control procedures in accordance with the preferred embodiment of the present invention, and are provided for a better understanding of the operations to which the present invention applied.

First of all, simple operation involved in a case that an IP terminal makes a call is now explained with reference to FIG. 2. Among other plural IP terminals depicted in FIG. 1, an arbitrary IP terminal dials to the other party, the dialing digit information is inputted into the call processing module 32 through exchange interface 30. At this time, the call processing module 32 concludes that a phone number for calling the other party is selected (S102), and searches out if the receiving party is an IP terminal (S104). This kind of search can be easily accomplished by referring to database containing a port number stored in connection with the phone number that is transported from the IP terminal.

If it turns out that the other party is an IP terminal (S104), the call processing module 32 controls the gateway 26 in the state of not being seized (or controlled or utilized) to be connected between IP terminals by IP driver 22. However, if the other party happens to be a legacy phone, the call processing module 32 seizes a channel by generating a seizure request signal to the gateway 26, and if there is a seizure request acknowledge (ACK) from the gateway 26, transports a gateway channel seizure acknowledge (ACK) message from a receiving call processing unit of the other party, that is, the legacy terminal, and rings the other party, and finally provides a ring back tone to the originating IP terminal.

If the legacy terminal dials the other party to talk on the phone, the dialing digit information is inputted into the call processing module 32 through subscriber's circuit (not shown—general call processing procedure of PSTN) in IP-PBX 14. As shown in FIG. 3, the call processing module 32 decides that a phone number for calling the other party is selected (S202), and searches out if the receiving party is an IP terminal (S204).

Similarly to before, if the other party turns out to be a legacy phone (S204), the call processing module 32 seizes a channel by generating a seizure request signal to the gateway 26, and if there is a seizure request ACK from the gateway 26, transports a gateway channel seizure acknowledge (ACK) message from a receiving call processing unit of the other party, that is, the legacy terminal, and rings the other party, and finally provides a ring back tone to the originating IP terminal. However, if it turns out that the other party is an IP terminal, the call processing module 32 controls the gateway 26 in the state of not being seized to be connected between IP terminals by IP driver 22.

In such manner, communication between two different kinds of terminals having different call processing procedures is done through a gateway.

Figure 4:
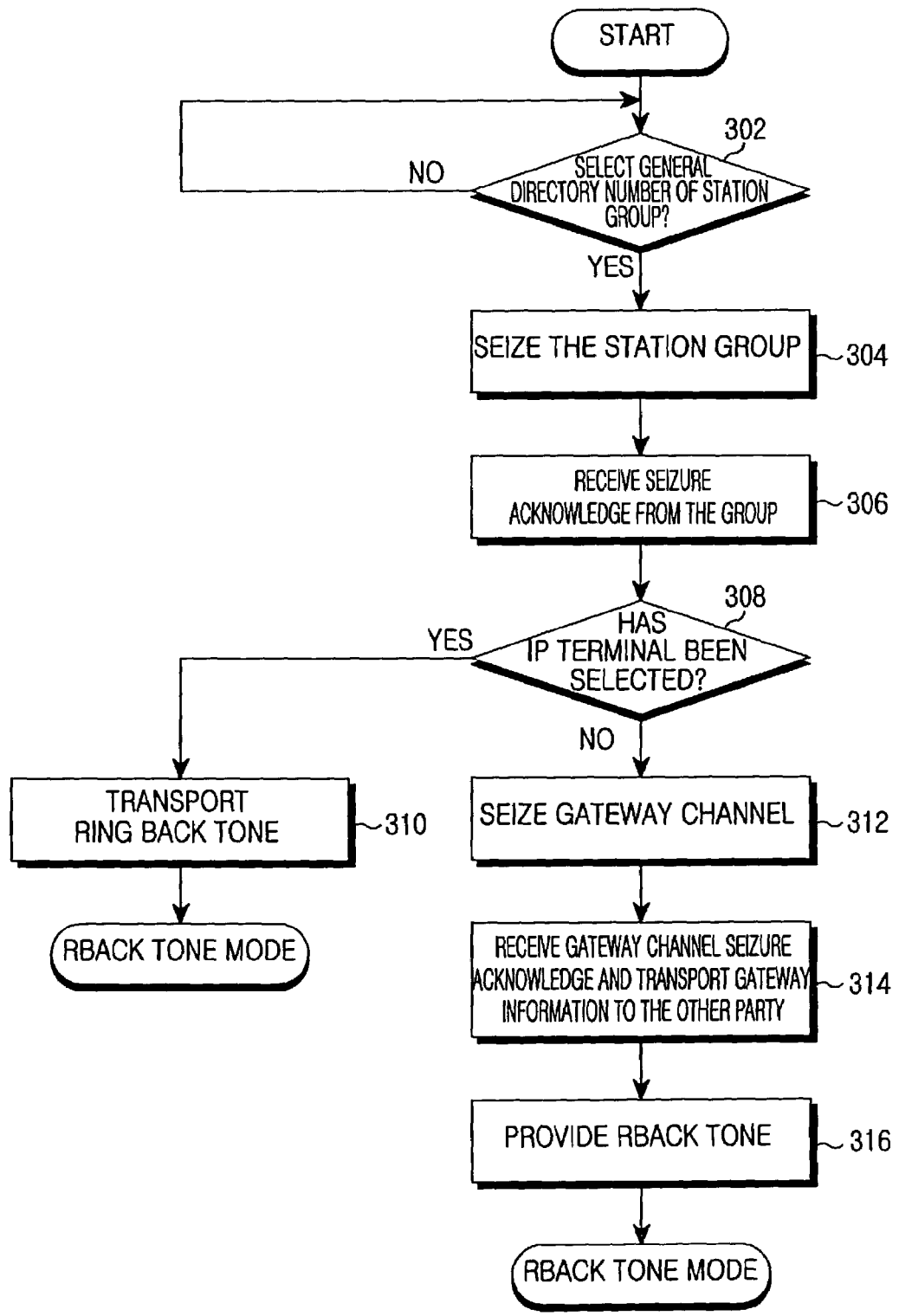
FIG. 4 is a flow chart illustrating a station group service control procedure in accordance with a first preferred embodiment of the present invention, more particularly, the procedure of controlling station group service when a calling party is an IP terminal.
Figure 5:
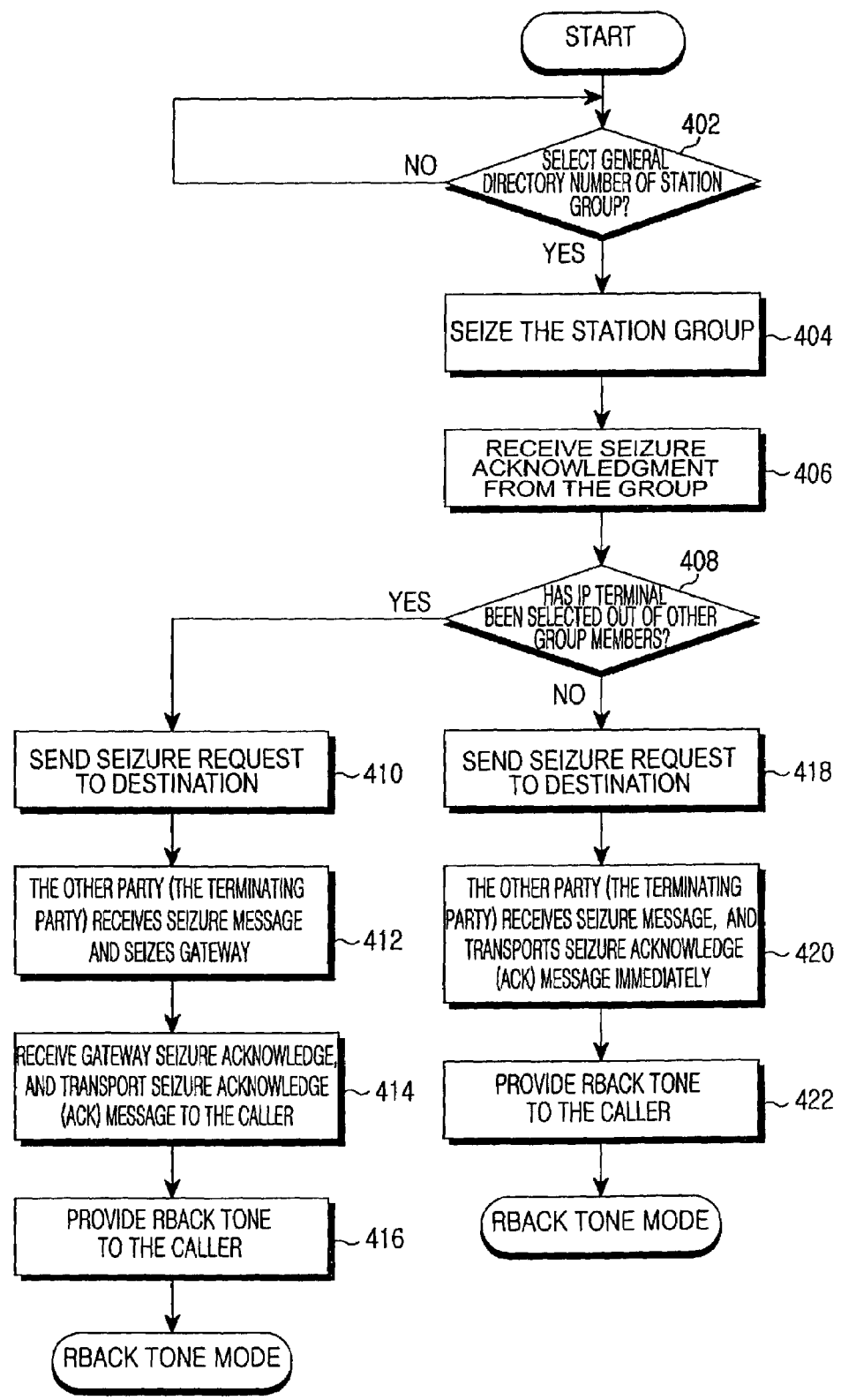
FIG. 5 is a flow chart illustrating a station group service control procedure in accordance with the first preferred embodiment of the present invention, more particularly, the procedure of controlling station group service when a calling party is a legacy terminal.

FIGS. 4 and 5 are flow charts illustrating station group service control procedure in accordance with a first preferred embodiment of the present invention, and more specifically, station group service control procedure when a caller is an IP/legacy terminal.

Among other plural IP terminals depicted in FIG. 1, an arbitrary IP terminal (or source terminal) dials a phone number corresponding to a general directory number of a station group among the station groups. Then, the dialing digit information is inputted into the call processing module 32 through exchange interface 30 in IP-PBX 14. Here, the call processing module 32 searches out if the general directory number belongs to the station group (S302) in FIG. 4. As mentioned before, this kind of search is easily done by referring to database.

Once the call processing module 32 concludes that the general directory number is from the station group (S302), it seizes the station group (S304), and receives a seizure acknowledge (ACK) message from an incoming call processing unit of the general directory number in the station group (S306). After receiving the seizure acknowledge (ACK) message (S306), originating call processing unit in the call processing module 32 searches out if the other party selected is an IP terminal (S308). Again, this search can be easily done by referring to database containing a port number in connection with the phone number that is transported from the IP terminal.

If the other party (or destination terminal) turns out to be an IP terminal (S308), the call processing module 32 controls the gateway 26 in a state of not being seized to be connected between IP terminals by IP driver 22, and provides a ring back tone to the originating IP terminal.

However, if the other party is a legacy phone, the call processing module 32 seizes a channel by generating a seizure request signal to the gateway 26 (S312), and if there is a seizure request ACK from the gateway 26, the call processing module 32 transports a gateway channel seizure acknowledge (ACK) message to an incoming call processing unit of the other party, that is, the legacy terminal (S314), and rings the other party, and finally provides a ring back tone to the originating IP terminal (S316).

If the legacy terminal already dialed the other party to talk on the phone, the dialing digit information is inputted into the call processing module 32 through the subscriber's circuit in IP-PBX 14. At this time, the call processing module 32 concludes that a phone number for calling the other party is selected (S402) as shown in FIG. 5, and seizes a station group (S404). And then, the call processing module 32 receives a station group seizure acknowledge (ACK) message from the incoming call processing unit where the terminating terminal's call corresponding to the general directory number of the station group (S406) is processed, and searches out if the other party is an IP terminal (S408).

If the other party turns out to be an IP terminal (S408), the call processing module 32 transports a seizure request message to the other party (S410). At this time, the other party, i.e., IP terminal (terminating party), which has the general directory number of the station group as its phone number, responses to the seizure request message, seizes the gateway, and transports a gateway seizure acknowledge (ACK) message to the originating call processing unit. Usually, the gateway seizure acknowledge (ACK) message includes gateway information.

On the other hand, the originating call processing unit 414 in the call processing module 32 of IP-PBX 14 transports the gateway seizure acknowledge (ACK) message to the caller, or the legacy terminal, to be connected to a traffic channel through the gateway, and provides a ring back tone to the originating legacy terminal. However, if the other party turns out to be a legacy terminal, the call processing module 32 provides a ring back tone to the originating legacy terminal as in the typical station group services while leaving the gateway 26 in the state of not being seized or unoccupied (S418 through 422).

Using the station group service described above, it is now possible to provide the station group service to the station group composed of different kinds of terminals having different call setup procedures.

Figure 6:
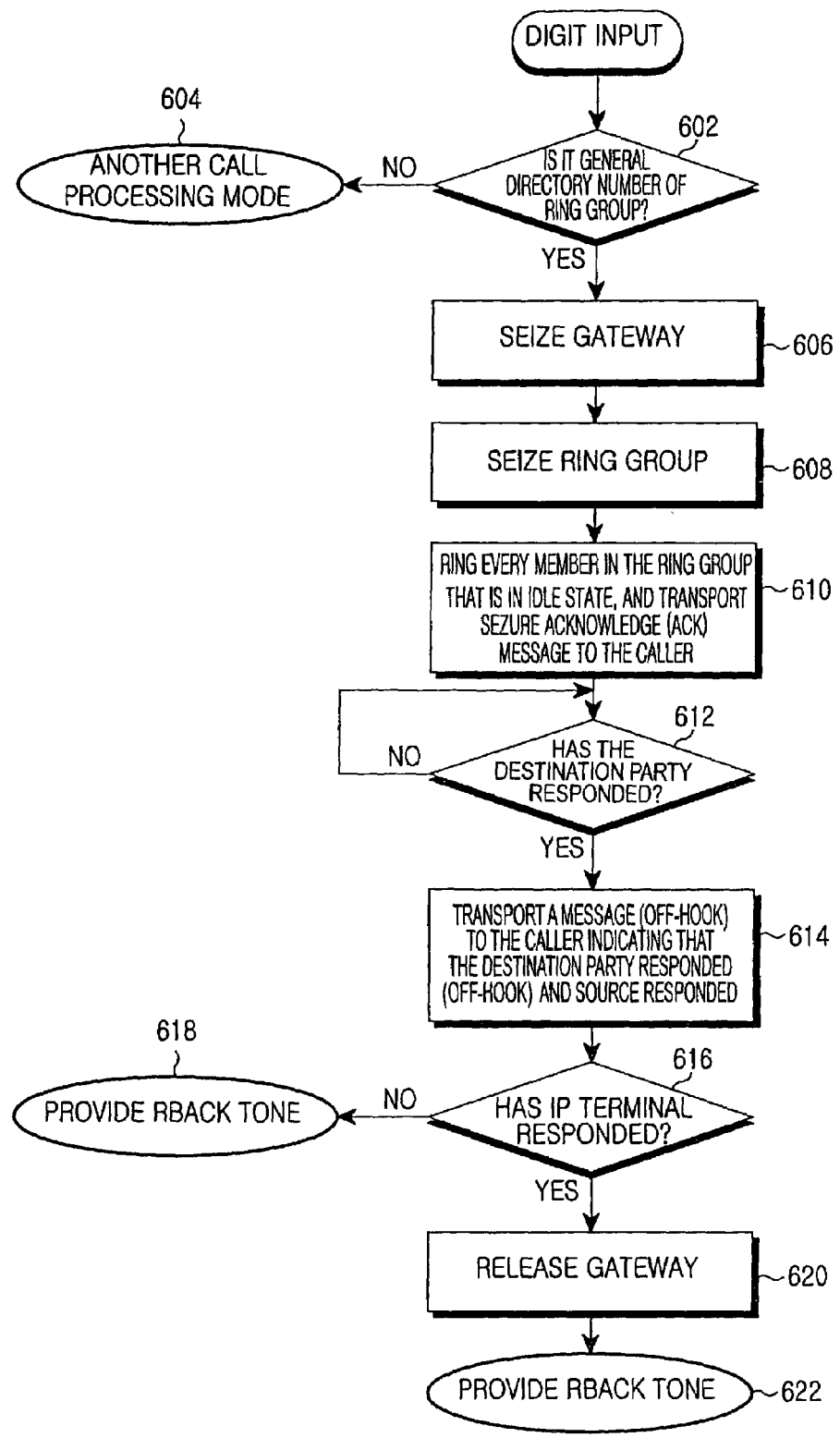
FIG. 6 a flow chart illustrating a station group service control procedure in accordance with a second preferred embodiment of the present invention, more particularly, the procedure of controlling ring group service when a calling party is an IP terminal.
Figure 7:
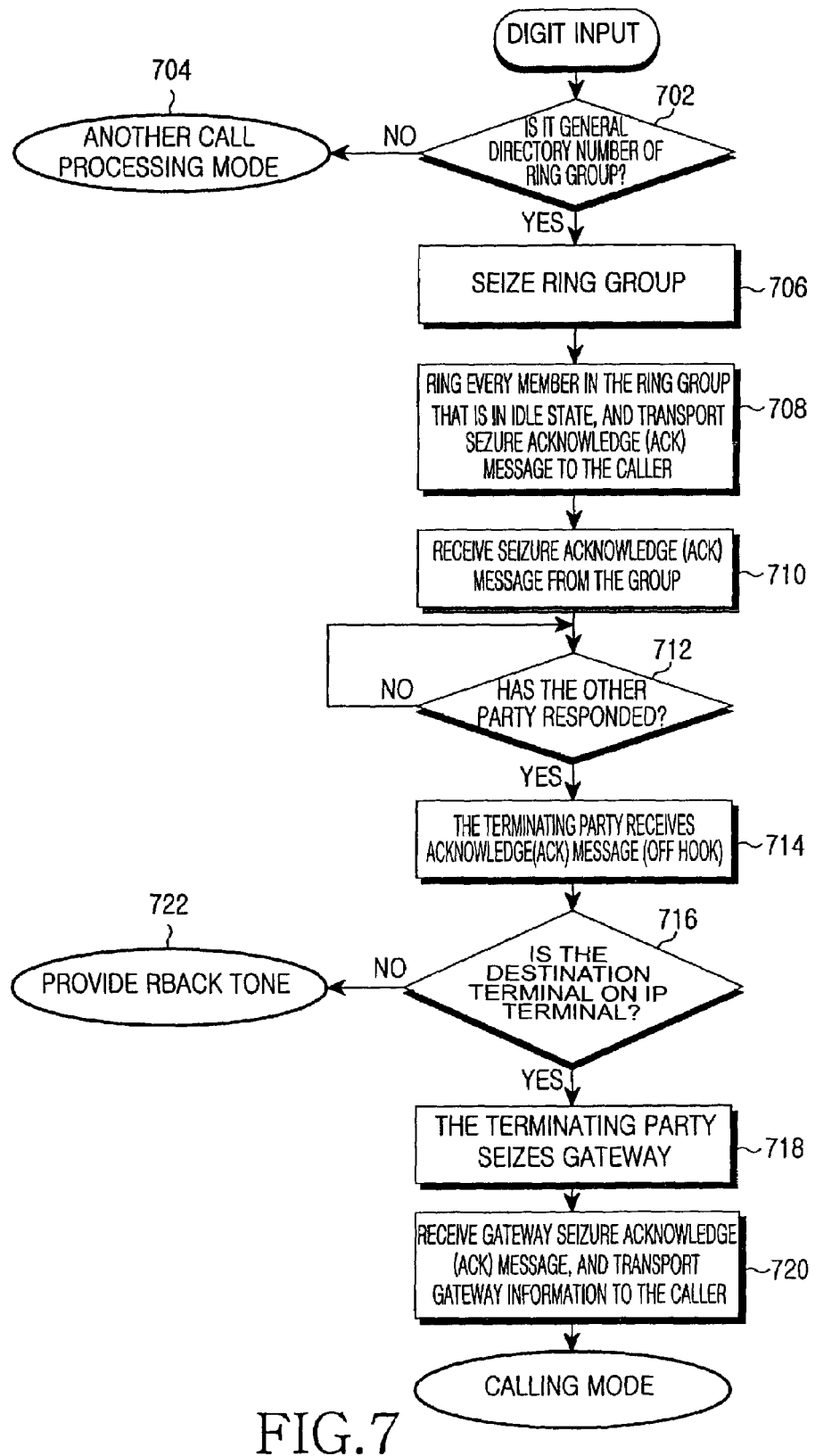
FIG. 7 is a flow chart illustrating a station group service control procedure in accordance with the second preferred embodiment of the present invention, more particularly, the procedure of controlling ring group service when a calling party is a legacy terminal.

FIGS. 6 and 7 are flow charts representing station group service procedure in accordance with a second preferred embodiment of the present invention, and more specifically, ring group service control procedure when a caller is an IP/legacy terminal.

Among other plural IP terminals depicted in FIG. 1, an arbitrary IP terminal dials a phone number corresponding to a general directory number of a station group among the station groups. Then, the dialing digit information is inputted into the call processing module 32 through exchange interface 30 in IP-PBX 14. Here, the call processing module 32 searches out if the general directory number belongs to the station group (S602) as shown in FIG. 6. Again, this kind of search is easily done by referring to database.

Once the call processing module 32 concludes that the general directory number is from the station group (S602), it seizes the ring group (S608). And, the call processing unit 32 rings every member in the idle state in the ring group (S610), and transports a gateway seizure acknowledge (ACK) message to the caller, the IP terminal. Here, if a corresponding member is in middle of conversation, the call processing module 32 queues the call into Que, and if the corresponding member finishes the call, the call processing module 32 calls the member immediately. When this procedure is completed, the originating call processing unit in IP-PBX 14 for controlling the call of the originating IP terminal searches out if the other party duly responded the call (S612).

If it is concluded that the other party answered the call (S612), the originating call processing unit sends the originating IP terminal a message indicating that the other party responded by doing a hook off, and that it responded as well. Later, the originating call processing unit of the call processing module 32 searches out if the responded terminal is an IP terminal (S616). If a legacy terminal responded, the originating call processing unit enters to a traffic channel connectable state through the seized gateway (S606), and provides a ring back tone to the originating IP terminal (S618). However, if the answering party is an IP terminal, the originating call processing unit releases the seized gateway (S620), and provides a ring back tone to the originating IP terminal (S622).

Among other plural legacy terminals depicted in FIG. 1, an arbitrary legacy terminal dials a phone number corresponding to a general directory number of a station group among the station groups. Then, the dialing digit information is inputted into the call processing module 32 through exchange interface 30 in IP-PBX 14. Here, the call processing module 32 searches out if the general directory number belongs to the station group (S702) as shown in FIG. 7. Again, this kind of search is easily done by referring to database.

Once the call processing module 32 concludes that the general directory number is from the station group (S702), it seizes the ring group (S706). And, the call processing unit 32 rings every member in the idle state in the ring group (S708), and transports a gateway seizure acknowledge (ACK) message to the caller, the legacy terminal. Here, if a corresponding member is in middle of conversation, the call processing module 32 queues the call into Que, and if the corresponding member finishes the call, the call processing module 32 calls the member immediately. When this procedure is completed, the originating call processing unit in IP-PBX 14 for controlling the call of the originating legacy terminal searches out if the other party duly responded the call (S712).

If it is concluded that the other party answered the call (S712), the originating call processing unit receives an acknowledge (ACK) message the other party sent. After that, the originating call processing unit in the call processing module 32 finds out if an IP terminal answered the call (S716), and if the other party turns out to be the IP terminal, the originating call processing unit sends the terminating IP terminal a gateway seizure request message for the terminating party, i.e., the IP terminal, to seize the gateway (S718). After the terminating IP terminal seizes the gateway and sends an acknowledge (ACK) message for that, the originating call processing unit transports the gateway information to the originating legacy terminal (S720), and enters to a traffic channel connectable state, and eventually to a busy mode.

However, if the other party who answered the call is a legacy terminal, the originating call processing unit takes the same procedure for processing the call of the legacy terminal in general, and provides a ring back tone to the originating legacy terminal.

Shortly speaking, the station group service described above makes it possible to provide ring group services to a station group composed of different kinds of terminals having different call setup procedures. In addition, by mixing those different kinds of terminals, a variety of service groups with different formats can be created. As a result, IP-PBX performances can be greatly improved.

In conclusion, the IP-PBX system wherein the call processing module therein controls information related to an IP terminal's call processing realized a multifunction system, being capable of providing station group services of legacy terminals and IP terminals more easily.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method, comprising the steps of:
    dialing a telephone number from a source IP terminal in an IP-PBX system;
    transporting said dialed telephone number from said source IP terminal;
    seizing a relevant destination station group in response to said dialing when a dialing digit corresponding to a general directory number of a station group is transported from said source IP terminal;
    receiving an acknowledgement signal for said seizure by said source IP terminal from said destination station group;
    determining whether said dialed telephone number corresponds to a destination legacy terminal or a destination IP terminal in said destination station group;
    seizing a gateway channel of said dialed telephone number when said dialed telephone number corresponds to a legacy terminal;
    providing a ring back tone to the source IP terminal and ringing the destination IP terminal when said dialed telephone number corresponds to an IP terminal; and
    ringing the destination legacy terminal and sending a ring back tone to said source IP terminal when destination terminal is a legacy terminal.

2. The method of claim 1, said legacy terminal being selected from a group consisting of an analog telephone and a digital telephone.

3. The method of claim 1, further comprising the steps of:
    said source IP terminal receiving acknowledgement of said gateway channel seizure; and
    said source IP terminal sending gateway information to said destination legacy terminal when said destination terminal is a legacy terminal.

4. A method, comprising the steps of:
    dialing a telephone number from a source legacy terminal in an IP-PBX system;
    transporting said dialed telephone number from said source legacy terminal;
    seizing a relevant destination station group in response to said dialing when a dialing digit corresponding to a general directory number of a destination station group is transported from said source legacy terminal;
    receiving an acknowledgement signal for said seizure by said source legacy terminal from said destination station group;
    sending a seizure request message to said destination terminal;
    determining whether said dialed telephone number corresponds to a destination legacy terminal or a destination IP terminal in said destination station group;
    providing a ring back tone to the source legacy terminal and ringing the destination legacy terminal when said dialed telephone number corresponds to a destination legacy terminal;
    seizing a gateway channel of said dialed telephone number when said dialed telephone number corresponds to an IP terminal; and
    ringing the destination IP terminal and sending a ring back tone to said source legacy terminal when destination terminal is an IP terminal.

5. The method of claim 4, the destination terminal sends a seizure acknowledge signal back to said source legacy terminal in response to said seizure request message when said destination terminal is a legacy terminal.

6. The method of claim 4, further comprising the steps of:
seizing a gateway by said destination terminal in response to said seizure request message;
receiving a gateway seizure acknowledgement signal from said gateway by said destination terminal; and
transporting said seizure acknowledgement signal to said source legacy terminal when said destination terminal is an IP terminal.

7. The method of claim 4, said legacy terminal being selected from a group consisting of an analog telephone and a digital telephone.

8. A method, comprising the steps of:
inputting digits in a source IP telephone to dial a destination number having a digit corresponding to a general directory number;
seizing a gateway channel of said destination number;
seizing an entire destination ring group of said destination number;
ringing every idle member in the destination ring group until one destination terminal in said ring group goes off hook;
releasing said seized gateway channel if said destination terminal is an IP terminal; and
providing a ring-back tone to said source IP terminal in response to said off hook condition of said destination terminal.

9. The method of claim 8, the step of providing a ring back tone further comprises recovering the seized gateway by the gateway when the destination terminal is an IP terminal.

10. The method of claim 8, the step of providing a ring back tone further comprises the gateway seizing another gateway and entering a busy mode when the destination party is a legacy terminal and forming a traffic channel between the source and the destination terminal by the gateway when the destination terminal is an IP terminal.

11. The method of claim 8, said legacy terminal being selected from a group consisting of an analog telephone and a digital telephone.

12. A method, comprising the steps of:
inputting digits in a source legacy telephone of an IP-PBX system, said digits corresponding to a destination ring group;
seizing said destination ring group;
ringing every on hook member in said ring group until a party in said ring group goes off hook in response to said ringing;
determining whether said responding party is a legacy terminal or an IP terminal;
sending a gateway seize request from said source to said responding party;
seizing a gateway of the responding party by said responding party when said responding party is an IP terminal; and
providing a ring back tone to said source IP terminal when said responding terminal is a legacy terminal.

13. The method of claim 12, further comprising the step of sending an acknowledgement signal from the destination ring group to the source party after the ring group has been seized.

14. The method of claim 12, further comprising the steps of:
sending a gateway seizure acknowledgement signal from the responding party to the source terminal; and
sending gateway information to the source terminal after the responding terminal siezes the gateway and when the responding terminal is an IP terminal.

15. The method of claim 12, said legacy terminal being selected from a group consisting of an analog telephone and a digital telephone.

16. The method of claim 1, said IP-PBX system comprising:
a hub connected to an IP terminal and having a plurality of LAN communication ports, said IP terminal having VoIP capabilities;
a user information interface connected to said LAN ports; and
a legacy terminal and said LAN connected to said IP-PBX, said IP-PBX having a database having telephone numbers of said legacy terminal, said IP terminal, group and ring service information, said IP-PBX further comprising said gateway conducting call processing services.

17. The method of claim 12, said IP-PBX system comprising:
a hub connected to an IP terminal and having a plurality of LAN communication ports, said IP terminal having VoIP capabilities;
a user information interface connected to said LAN ports; and
a legacy terminal and said LAN connected to said IP-PBX, said IP-PBX having a database having telephone numbers of said legacy terminal, said IP terminal, group and ring service information, said IP-PBX further comprising said gateway conducting call processing services.

18. An apparatus, comprising:
a legacy terminal connected to an IP-PBX;
an IP terminal connected to a hub, said hub connected to said IP-PBX via LAN ports;
an IP network connected to said hub;
a PSTN connected to said IP-PBX;
an IP driver connected to said hub, said IP-PBX comprising a database having the telephone numbers of said legacy terminal and said IP terminal, said IP-PBX having a gateway enabling station group service and ring group services to said IP terminal and said legacy terminal.

19. The apparatus of claim 18, said legacy terminal being selected from a group consisting of an analog telephone and a digital telephone.

20. The apparatus of claim 18, a plurality of legacy terminals and a plurality of IP terminals are connected to said IP-PBX.

* * * * *